US009805061B2

(12) United States Patent
Chang et al.

(10) Patent No.: US 9,805,061 B2
(45) Date of Patent: Oct. 31, 2017

(54) IMAGE SEARCH FOR A LOCATION

(71) Applicant: International Business Machines Corporation, Armonk, NY (US)

(72) Inventors: Billy W. Chang, Rockville, MD (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 14/546,826

(22) Filed: Nov. 18, 2014

(65) Prior Publication Data
US 2016/0140144 A1  May 19, 2016

(51) Int. Cl.
*G06K 9/00*      (2006.01)
*G06F 17/30*     (2006.01)
*G06T 17/05*     (2011.01)

(52) U.S. Cl.
CPC .. *G06F 17/30247* (2013.01); *G06F 17/30241* (2013.01); *G06F 17/30864* (2013.01); *G06K 9/0063* (2013.01); *G06K 9/00476* (2013.01); *G06T 17/05* (2013.01); *G06T 2207/30181* (2013.01)

(58) Field of Classification Search
CPC ......... G06F 17/30247; G06F 17/30241; G06F 17/30864; G06T 2207/10016; G06T 7/20; G06T 7/2033; G06T 7/2053; G06T 17/05; H04N 5/145; G06K 9/00627; G09B 29/106; H03M 1/00; H03M 2201/01
See application file for complete search history.

(56) References Cited

U.S. PATENT DOCUMENTS

| 7,076,443 | B1  | 7/2006  | Emens et al. |
| 7,548,936 | B2* | 6/2009  | Liu ................... G06F 17/30274 |
| 7,647,166 | B1* | 1/2010  | Kerns ................ G01C 21/3679 340/988 |
| 7,813,529 | B1  | 10/2010 | Gershenson |
| 8,070,629 | B2* | 12/2011 | Balardeta ............... A63B 57/00 382/113 |
| 8,150,617 | B2  | 4/2012  | Manber et al. |

(Continued)

FOREIGN PATENT DOCUMENTS

| WO | 2006103437 | 10/2006 |
| WO | 2012138837 | 10/2012 |

(Continued)

OTHER PUBLICATIONS

Pervarski et al. "Virginia Pilot Project: Technology Meets Damage Prevention" Nov. 2009, 1 page.*

(Continued)

*Primary Examiner* — Chan Park
*Assistant Examiner* — Mia M Thomas
(74) *Attorney, Agent, or Firm* — Janaki K. Davda; Konrad, Raynes, Davda and Victor LLP

(57) ABSTRACT

Provided are techniques for image search for a location. Street view data is extracted to identify a path for a region. Points of interest for the path are identified. Images for the points of interest for a direction of the path are identified. The images are used to create a sequence of images representing a view of the points of interest along the direction of the path. The sequence of images are displayed adjacent to a map that includes the path.

12 Claims, 6 Drawing Sheets

(56) References Cited

U.S. PATENT DOCUMENTS

| | | | |
|---|---|---|---|
| 8,164,599 B1* | 4/2012 | Kadous | G01C 21/20 345/629 |
| 8,315,791 B2* | 11/2012 | Bales | G01C 21/20 340/989 |
| 8,339,419 B1* | 12/2012 | Kadous | G01C 21/20 345/629 |
| 8,509,488 B1* | 8/2013 | Enge | G01C 21/3623 382/106 |
| 8,588,547 B2* | 11/2013 | Giuffrida | G06T 3/4038 345/629 |
| 8,897,541 B2* | 11/2014 | Weisenburger | G01C 11/00 345/629 |
| 8,942,483 B2* | 1/2015 | Janky | G01C 15/00 382/100 |
| 9,280,269 B2* | 3/2016 | Nielsen | G06K 7/10821 |
| 9,489,403 B2 | 11/2016 | Eskolin et al. | |
| 9,582,579 B2 | 2/2017 | Barak et al. | |
| 2005/0083212 A1* | 4/2005 | Chew | G08G 1/14 340/932.2 |
| 2005/0281437 A1* | 12/2005 | Fruchter | G06K 9/222 382/113 |
| 2005/0286739 A1* | 12/2005 | Pilu | G06K 9/00624 382/103 |
| 2006/0089792 A1* | 4/2006 | Manber | G01C 21/3644 701/408 |
| 2007/0076920 A1* | 4/2007 | Ofek | G06T 3/4038 382/113 |
| 2007/0196033 A1* | 8/2007 | Russo | G06F 17/30525 382/305 |
| 2008/0056538 A1* | 3/2008 | Frank | G06F 3/0481 382/113 |
| 2008/0086686 A1* | 4/2008 | Jing | G01C 21/3605 715/706 |
| 2009/0005078 A1* | 1/2009 | Dariel | G06K 9/72 455/456.2 |
| 2009/0092277 A1* | 4/2009 | Ofek | G06K 9/3233 382/100 |
| 2009/0201311 A1* | 8/2009 | Nielsen | G06Q 10/06 345/594 |
| 2010/0034483 A1 | 2/2010 | Giuffrida et al. | |
| 2010/0220174 A1* | 9/2010 | Mendoza | G06F 17/3087 348/39 |
| 2010/0268463 A1* | 10/2010 | Kurtti | G01C 21/3679 701/469 |
| 2010/0309196 A1* | 12/2010 | Castleman | G06T 13/80 345/418 |
| 2013/0030870 A1* | 1/2013 | Swinson | G06Q 10/06 705/7.35 |
| 2013/0097197 A1* | 4/2013 | Rincover | G06F 17/3087 707/766 |
| 2013/0182108 A1* | 7/2013 | Meadow | G06T 17/05 348/143 |
| 2013/0294657 A1* | 11/2013 | Chen | G06F 17/30247 382/113 |
| 2014/0152770 A1* | 6/2014 | Carides | H04N 7/185 348/46 |
| 2014/0219514 A1* | 8/2014 | Johnston | G01C 11/06 382/113 |
| 2014/0362230 A1* | 12/2014 | Bulan | G06K 9/00624 348/169 |
| 2015/0379344 A1* | 12/2015 | Haas | G06K 9/00476 382/113 |
| 2016/0300386 A1* | 10/2016 | Bostick | G01C 21/26 |
| 2017/0011149 A1* | 1/2017 | Liu | G01V 99/005 |

FOREIGN PATENT DOCUMENTS

| | | |
|---|---|---|
| WO | 2013092058 | 6/2013 |
| WO | 2013116100 | 8/2013 |

OTHER PUBLICATIONS

Milford et al. "Mapping a Suburb With a Single Camera Using a Biologically Inspired SLAM System" IEEE Transactions on Robotics, vol. 24, No. 5, Oct. 2008 pp. 1-16.*

Xu et al. "Combining empirical experimentation and modeling techniques: A design research approach for personalized mobile . . ." Decision Support Systems—Feb. 2008 (pp. 1-16).*

U.S. Appl. No. 14/715,205 (54.113C1), filed May 18, 2015, invented by Billy W. Chang et al., Total 21 pages.

Preliminary Amendment, dated May 18, 2015, for U.S. Appl. No. 14/715,205 (54.113C1), filed May 18, 2015, invented by Billy W. Chang et al., Total 5 pages.

List of IBM Patents or Patent Applications Treated as Related, Total 2 pp., May 18, 2015.

Office Action, dated Mar. 28, 2016, for U.S. Appl. No. 14/715,205 (54.113C1), filed May 18, 2015, invented by Billy W. Chang et al., Total 19 pages.

Response to Office Action, dated Jun. 24, 2016, for U.S. Appl. No. 14/715,205 (54.113C1), filed May 18, 2015, invented by Billy W. Chang et al., Total 14 pages.

Final Office Action, dated Oct. 6, 2016, for U.S. Appl. No. 14/715,205 (54.113C1), filed May 18, 2015, invented by Billy W. Chang et al., Total 25 pages.

Response to Final Office Action, dated Jan. 5, 2017, for U.S. Appl. No. 14/715,205 (54.113C1), filed May 18, 2015, invented by Billy W. Chang et al., Total 8 pages.

Office Action, dated Mar. 10, 2017, for U.S. Appl. No. 14/715,205 (54.113C1), filed May 18, 2015, invented by Billy W. Chang et al., Total 19 pages.

Response to Office Action, dated May 30, 2017, for U.S. Appl. No. 14/715,205 (54.113C1), filed May 18, 2015, invented by Billy W. Chang et al., Total 12 pages.

U.S. Appl. No. 13/969,434, filed Aug. 16, 2013, entitled, "Searching and Classifying Information About Geographic Objects Within a Defined Area of an Electronic Map", invented by B.W. Chang et al., Total 24 pp. [57.349 (Appln)].

Notice of Allowance, dated Jun. 19, 2017, for U.S. Appl. No. 14/715,205 (54.113C1), filed May 18, 2015, invented by Billy W. Chang et al., Total 15 pages.

\* cited by examiner

IMAGE SEARCH FOR A LOCATION

FIELD

Embodiments of the invention relate to image search for a location.

BACKGROUND

Currently, a user may submit a text search request to a search engine to obtain images. In particular, in response to a user providing a location name as an image search query, image search results are displayed. Also, some images may be repeated in the search results.

From the image search results, it may be difficult to know where exactly the pictures are taken, what the sequences of the images are, etc. A user may want to know the sequence of the images so that, while travelling to the location, the user may view points of interest in sequence of where the images were taken.

SUMMARY

Provided is a method, a computer program product, and a computer system for image search for a location. Street view data is extracted to identify a path for a region. Points of interest for the path are identified. Images for the points of interest for a direction of the path are identified. The images are used to create a sequence of images representing a view of the points of interest along the direction of the path. The sequence of images are displayed adjacent to a map that includes the path.

BRIEF DESCRIPTION OF THE SEVERAL VIEWS OF THE DRAWINGS

In the drawings, like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
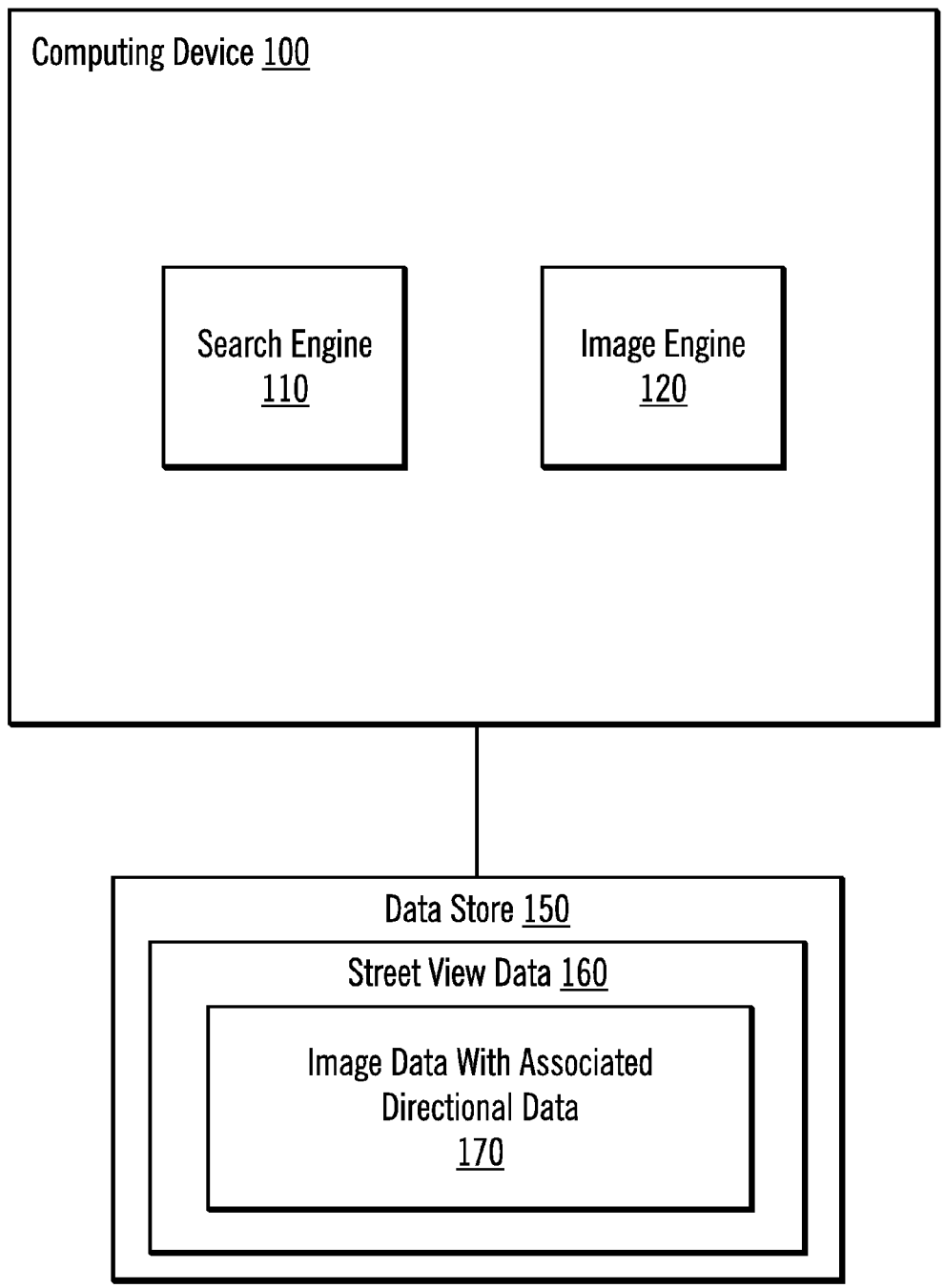
FIG. 1 illustrates, in a block diagram, a computing environment in accordance with certain embodiments.

FIG. 1 illustrates, in a block diagram, a computing environment in accordance with certain embodiments. In FIG. 1, a computing device 100 is coupled to a data store 150. The computing device 100 includes a search engine 110 (for use in searching for images) and an image engine 120 (for use in sequencing a set of images). The data store includes street view data 160, which includes image data with associated directional data 170. Street view data may be described as data describing a location from a perspective of a street view. The image data 170 may include photographs, hand drawn pictures or paintings, and other types of images. The image data with associated directional data 170 may contain encoded Global Positioning System (GPS) coordinates and direction (azimuth) information for each of the images.

Figure 2:
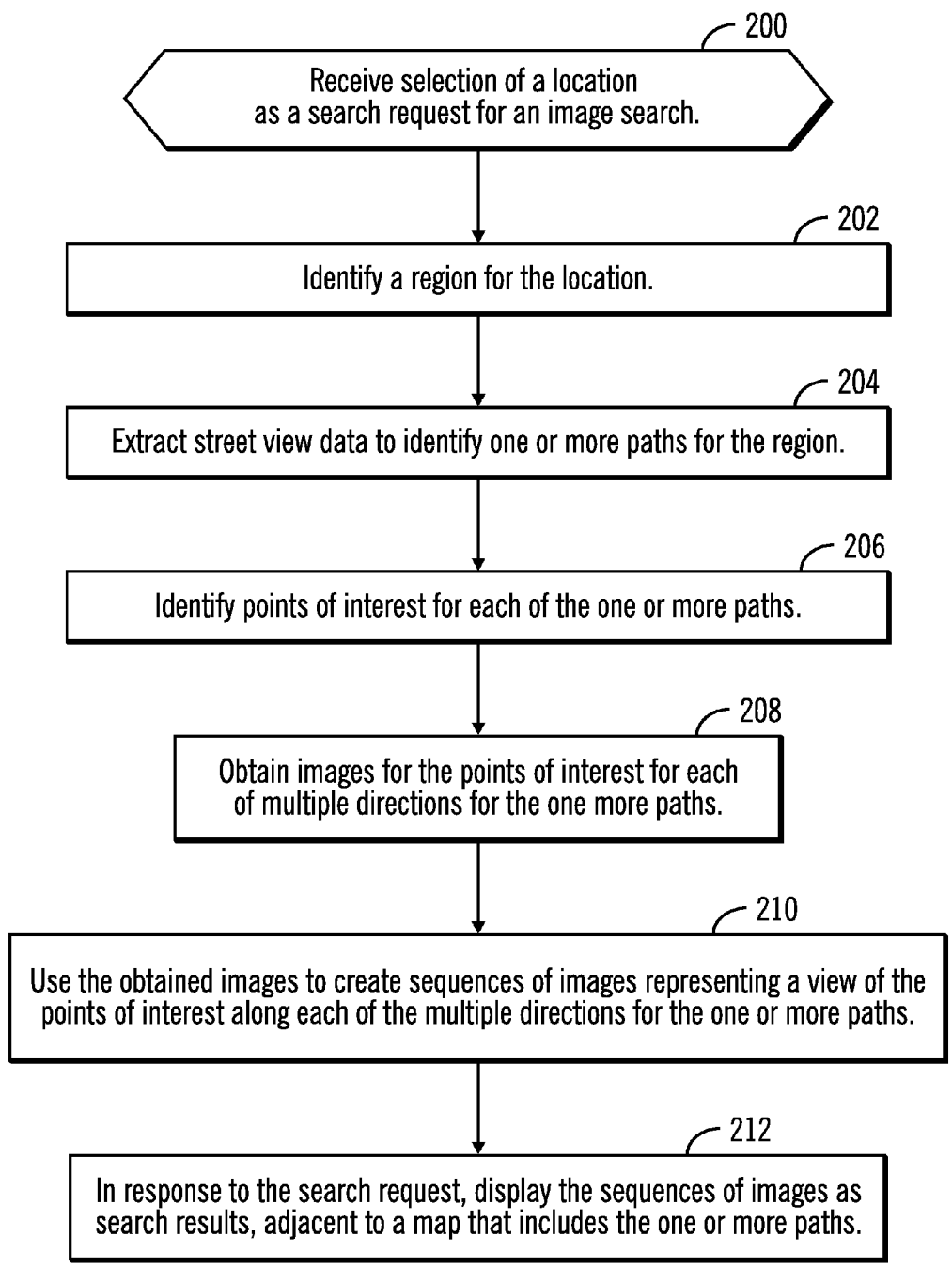
FIG. 2 illustrates, in a flow diagram, operations for providing a sequence of images in accordance with certain embodiments.

FIG. 2 illustrates, in a flow diagram, operations for providing a sequence of images in accordance with certain embodiments. The sequence of images provides a visual tour of a location. Control begins at block 200 with the image engine 120 receiving selection of a location as a search request for an image search. The location may be a point or a region. In certain embodiments, a user provides the search request for selection of the location by 1) inputting a location name (e.g., a building name, a shopping center name, a park name, a school name, etc.) into the search engine 110, 2) inputting an address into the search engine 110 or 3) by selecting (e.g., using a mouse) a point (an X, Y coordinate) on a map displayed on a computer screen or by entering on the X, Y coordinate as the search request. In certain embodiments, a user provides the search request for the location by providing a boundary for a region (e.g., by drawing a boundary, using a mouse, around the location on an electronic map displayed on a computer screen).

In block 202, the image engine 120 identifies a region for the location. In certain embodiments, if the selection of the location was received as a boundary for a region, then the image engine 120 identifies this region. In certain embodiments, if the selection of the location was received as a point (X, Y coordinate), then the image engine 120 identifies a region based on a pre-determined (default) amount of area around the point (e.g., a 5 mile radius around the point). In certain embodiments, if the location is received as a location name, the image engine 120 identifies a region encompassed by that location (e.g., by that building, shopping center, park, school, etc.).

In block 204, the image engine 120 extracts street view data 160 to identify one or more paths for the region. In various embodiments, the street view data may be obtained from data stores other than data store 150 (e.g., from, for example, data stores available on the Internet).

In block 206, the image engine 120 identifies points of interest for each of the paths. For example, the points of interest on a path may be tourist attractions, buildings, shopping centers, parks, schools, etc.

In block 208, the image engine 120 obtains images for the points of interest for each of the multiple directions for each of the one or more paths. For example, if a region has a first path running north and south and a second path running east and west, the image engine 120 obtains images for the points of interest for: 1) the first path for the north direction, 2) for the first path for the south direction, 3) for the second path for the east direction, and 4) for the second path for the west direction.

In certain embodiments, the images are photographs that may be obtained from the street view data 160, and the image engine 120 extracts individual photographs from the street view data 160 for the points of interest and the directions. The point of interest may be described as a historical image point of interest and, from that point of interest and a direction, the street view data is extracted that corresponds to one or more photographs. In certain embodiments, the historical image points of interest are identified based on gathering historical camera click action. That is, the image engine 120 identifies points of interest and directions based on where multiple people have captured photographs along a path. For example, if many people have taken photos of point of interest A from the North direction, then, this point of interest A and direction of North may be used to search for more images (photographs) for that point of interest and along that direction of North. This type of analysis may be referred to as historical image data analysis.

In block 210, the image engine 120 uses the obtained images to create sequences of images representing a view of the points of interest along each of the multiple directions for the one or more paths. In block 212, the image engine 120, in response to the search request (of block 200), displays the sequences of images as search results, adjacent to a map that includes (displays) the one or more paths. In certain embodiments, the image engine 120 returns the sequences of images to the search engine 110 for display to a user. Thus, each sequence of images provides images of points of interest along a direction of a path in a region.

In certain embodiments, based on different user's photography data, the image engine 120 identifies the points of interest and directions of photographs of the location and where most of the photographs were captured in the location. Then, the image engine 120 extracts images from the street view data 160 and knows from which points of interest and directions different photographs were captured (e.g., by different users).

In certain embodiments, the image engine 120 creates a ranking of each of the extracted images from the street view data 160. The image engine 120 (or via the search engine 120) displays the search results with a sequence of images displayed in order of a direction of a path (e.g., a road, street, highway, river, trail, hallway (e.g., of a building), etc.). In certain embodiments, the image engine 120 provides a coordinating code for each path and each sequence of images, so that a user can understand the location of images in the search results. The code may be a color code with each path having a same color as borders of the images for that path, may be a line code with each path having a same type of line (e.g., solid, dashed, etc.) as the borders of the images for that path, etc.

Figure 3:
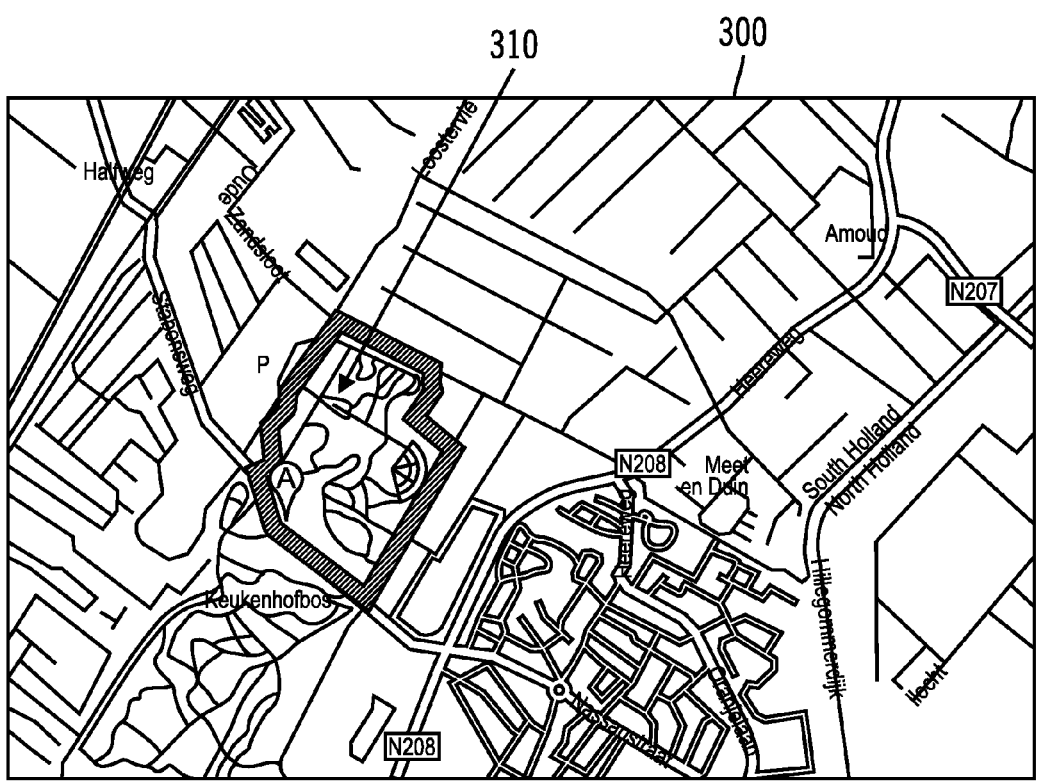
FIG. 3 illustrates selection of a location in an electronic map in accordance with certain embodiments.

FIG. 3 illustrates selection of a location 310 in an electronic map 300 in accordance with certain embodiments. In FIG. 3, a user has defined a boundary around a location 310 in an electronic map 310 that is displayed on a computer screen. In the example of FIG. 3, a user had defined a location boundary of ABC gardens in the electronic map 310. In the example of FIG. 3, a user has used the search engine 110 to search for a location "ABC Gardens", and the electronic map 300 is displayed. Then, the user has defined the boundary in the electronic map 300 as an image search query. In certain embodiments, the user may draw the boundary "free hand" (e.g., with a finger) or with an input device (e.g., a mouse) to define an area of the location.

Figure 4:
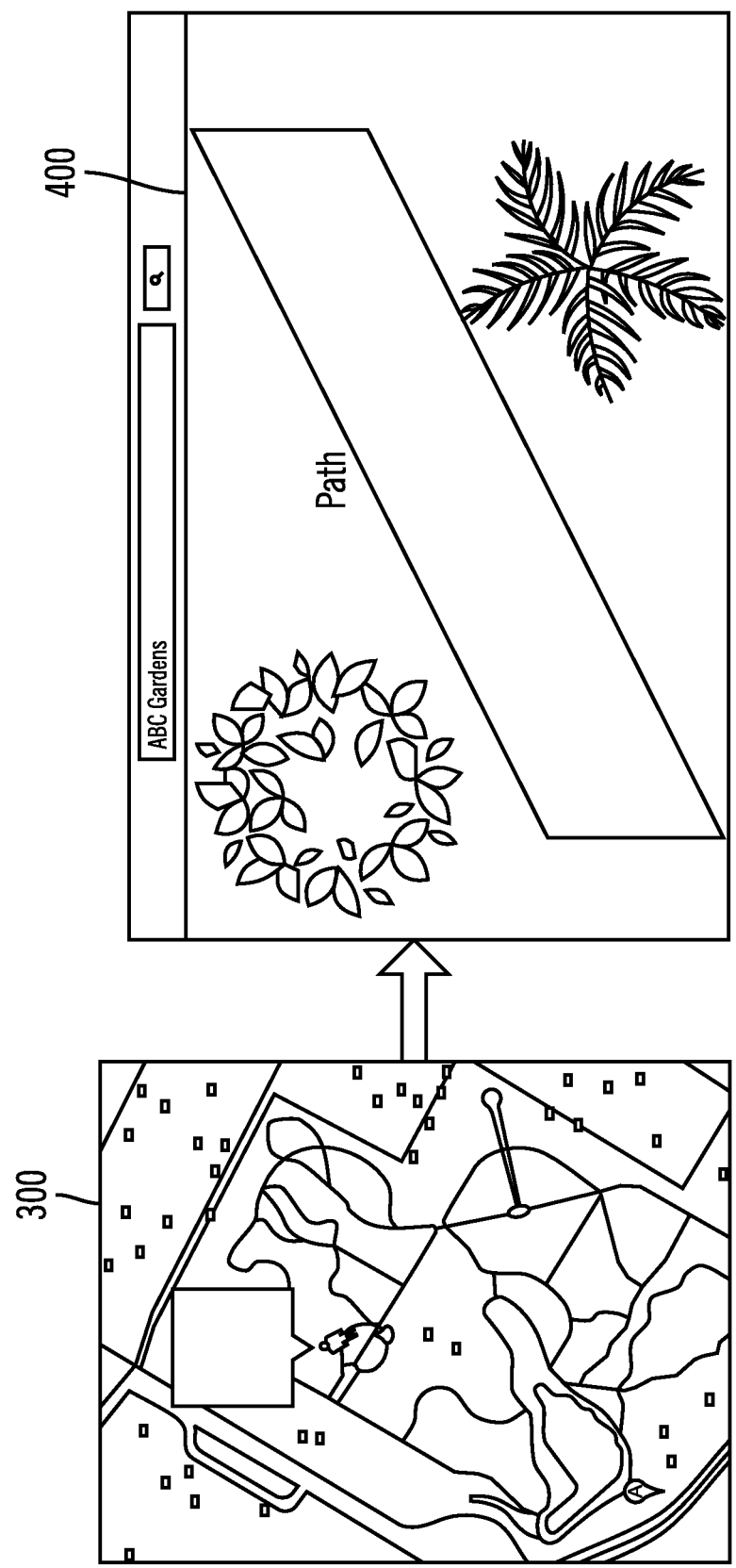
FIG. 4 illustrates a street view in accordance with certain embodiments.

FIG. 4 illustrates a street view 400 in accordance with certain embodiments. In FIG. 4, the image engine 120 has gathered street view data 160 and extracted images 170 from the street view data 160. Then, on the map, the image engine 120 identifies different points of interest and directions of images based on image data from different users. In this example, the image engine 120 arranges the extracted images in sequence as per the progression of the path in street view 400. Another sequence of images may capture a different direction of the same path, and users may select different directions to get different views.

Figure 5:
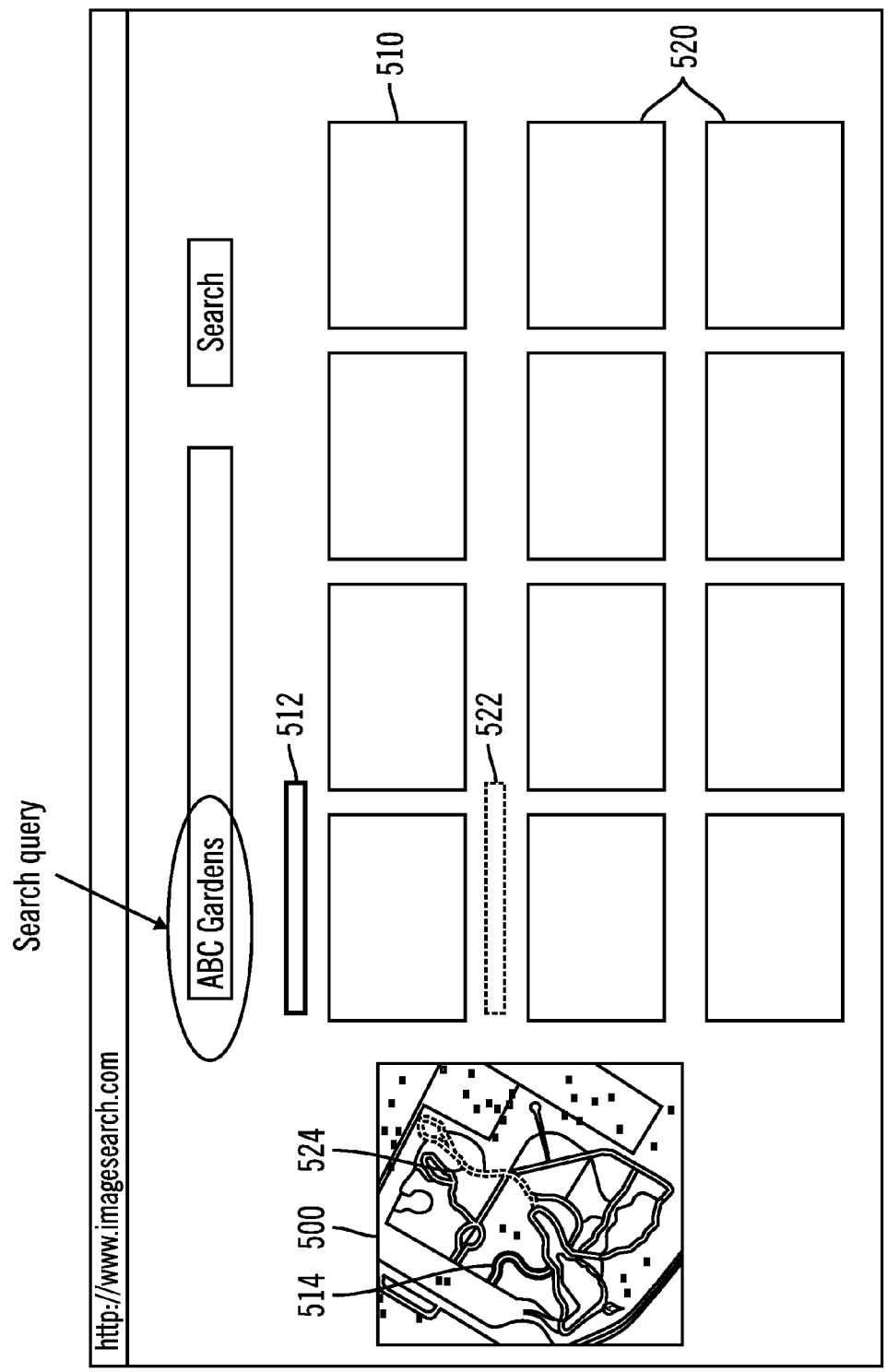
FIG. 5 illustrates sequences of images in accordance with certain embodiments.

FIG. 5 illustrates sequences of images in accordance with certain embodiments. In FIG. 5, two sequences of images 510, 520 are displayed adjacent to a map 500. The map 500 includes a first path associated with the sequence of images 510 and a second path associated with the sequence of images 520. Coordinating code 512 indicates that the sequence of images 510 is associated with the first path 514, which is shown by a bold line in the map 500. Coordinating code 522 indicates that the sequence of images 520 is associated with the second path 524, which is shown by a dashed line in the map 500.

In certain embodiments, each sequence of images may be displayed in one or more rows. In certain embodiments, the image engine 120 may rank the sequences of images in the search results based on a length of a path, a number of points of attraction along the path or other factors. Also, the image engine 120 may remove duplicates from each sequence of images.

In certain embodiments, a user defines an area in an electronic map for providing an image search query for the location. The image engine extracts the street view data of the selected location, identifies different points of interest and directions of photography, and, accordingly, the image engine 120 knows the location and directions of photographs to be extracted from the street view data. Then, the image engine 120 arranges the images in sequence for each street or direction.

For example, from a street view, a large number of photographs may be extracted. However, it may not be desirable to extract all the photographs and show these in the search results. Therefore, the image engine 120 identifies points of interest based on historical image points of interest and directions and extracts images from the street view data based on the identified points of interest. Accordingly, the image engine 120 knows the location and directions of photographs to be extracted from the street view data. Then, the image engine 120 arranges the images in sequence for each direction of each path.

The image engine 120 displays the images as search results with appropriate color coding (e.g., for different paths).

For example, different roads may be color coded so that the user may understand different photographs shown for different roads. In certain embodiments, one area may have different paths, and these paths are color coded. The image engine 120 may provide multiple photographs for different roads by clustering the photographs based on the identified paths.

The image engine 120 provides the ability to "see" the points of interest in a path in the location in sequence. The image engine 120 provides the ability to create a directed tour of a location by finding photos taken along the path and presenting the photos in sequence. With such abilities, embodiments are useful, for example, with public safety, law enforcement, real estate, etc.

Figure 6:
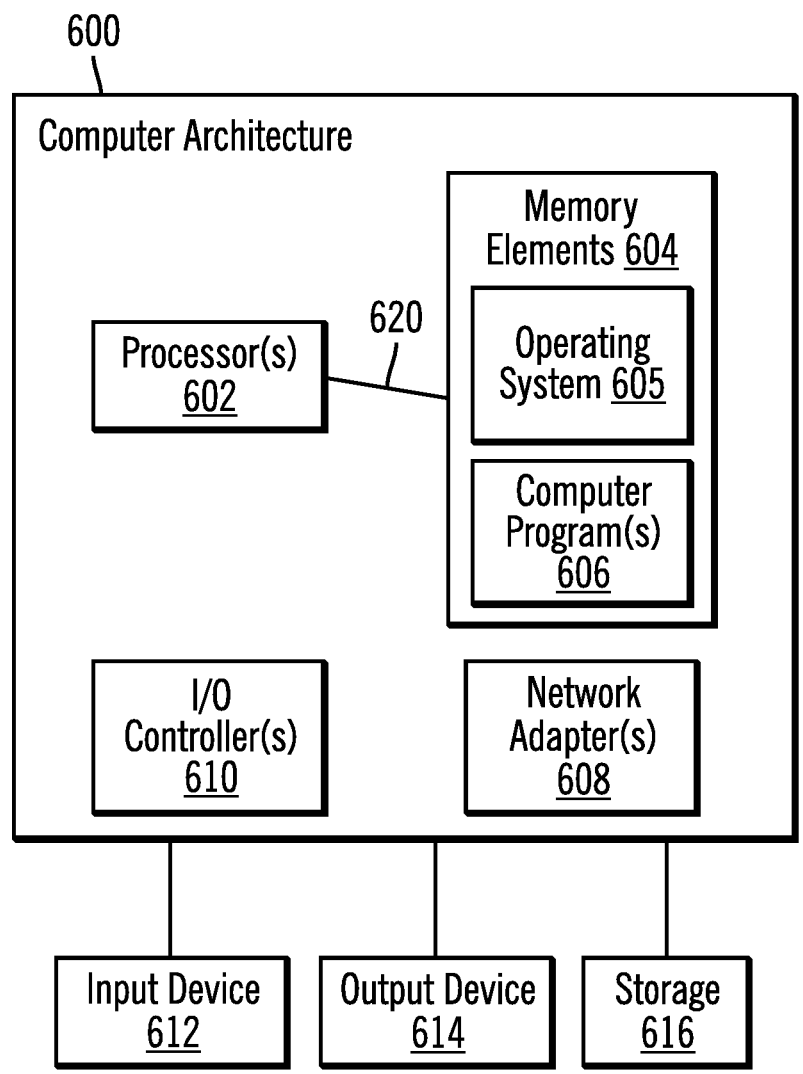
FIG. 6 illustrates, in a block diagram, a computer architecture that may be used in accordance with certain embodiments.

FIG. 6 illustrates a computer architecture 600 that may be used in accordance with certain embodiments. In certain embodiments, computing device 100 may implement computer architecture 600. The computer architecture 600 is suitable for storing and/or executing program code and includes at least one processor 602 coupled directly or indirectly to memory elements 604 through a system bus 620. The memory elements 604 may include local memory employed during actual execution of the program code, bulk storage, and cache memories which provide temporary storage of at least some program code in order to reduce the number of times code must be retrieved from bulk storage during execution. The memory elements 604 include an operating system 605 and one or more computer programs 606.

Input/Output (I/O) devices 612, 614 (including but not limited to keyboards, displays, pointing devices, etc.) may be coupled to the system either directly or through intervening I/O controllers 610.

Network adapters 608 may also be coupled to the system to enable the data processing system to become coupled to other data processing systems or remote printers or storage devices through intervening private or public networks. Modems, cable modem and Ethernet cards are just a few of the currently available types of network adapters 608.

The computer architecture 600 may be coupled to storage 616 (e.g., any type of storage device; a non-volatile storage area, such as magnetic disk drives, optical disk drives, a tape drive, etc.). The storage 616 may comprise an internal storage device or an attached or network accessible storage. Computer programs 606 in storage 616 may be loaded into the memory elements 604 and executed by a processor 602 in a manner known in the art.

The computer architecture 600 may include fewer components than illustrated, additional components not illustrated herein, or some combination of the components illustrated and additional components. The computer architecture 600 may comprise any computing device known in the art, such as a mainframe, server, personal computer, workstation, laptop, handheld computer, telephony device, network appliance, virtualization device, storage controller, etc.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product, the computer program product comprising a computer readable storage medium having program code embodied therewith, the program code executable by at least one processor to perform:
   receiving, by the at least one processor, selection of a location in a search request;
   identifying, by the at least one processor, a region around the location;
   identifying, by the at least one processor, multiple paths, each of the multiple paths having a different direction through the region;
   for each of the multiple paths,
      identifying, by the at least one processor, points of interest for the path based on a direction of the path, wherein each of the points of interest is identified based on multiple images having been captured by different users at that point of interest and for that direction;
      obtaining, by the at least one processor, images from the multiple images for the points of interest for the direction of the path;
      using, by the at least one processor, the images to create a sequence of images representing a view of the points of interest along the direction of the path; and
   displaying, by the at least one processor, in response to the search request, the sequence of images for each of the multiple paths adjacent to a map that displays each of the multiple paths.

2. The computer program product of claim 1, wherein the location is a point, and wherein the region is identified as an area surrounding the point.

3. The computer program product of claim 1, wherein the images in the sequence of images represent a street view of the points of interest along a path of the multiple paths.

4. The computer program product of claim 1, wherein the program code is executable by the at least one processor to perform:
   ranking each of the images to form the sequence of images.

5. The computer program product of claim 1, wherein the region is identified by receiving a name of the location.

6. The computer program product of claim 1, wherein the region is identified by receiving a boundary of the region on an electronic map displayed on a computer screen.

7. A computer system, comprising:
   one or more processors, one or more computer-readable memories and one or more computer-readable, tangible storage devices; and
   program instructions, stored on at least one of the one or more computer-readable, tangible storage devices for execution by at least one of the one or more processors via at least one of the one or more memories, to perform operations, the operations comprising:
   receiving, selection of a location in a search request;
   identifying a region around the location;
   identifying multiple paths, each of the multiple paths having a different direction through the region;
   for each of the multiple paths,
      identifying points of interest for the path based on a direction of the path, wherein each of the points of interest is identified based on multiple images having been captured by different users at that point of interest and for that direction;
      obtaining images from the multiple images for the points of interest for the direction of the path;
      using the images to create a sequence of images representing a view of the points of interest along the direction of the path; and
   displaying, in response to the search request, the sequence of images for each of the multiple paths adjacent to a map that displays each of the multiple paths.

8. The computer system of claim 7, wherein the location is a point, and wherein the region is identified as an area surrounding the point.

9. The computer system of claim 7, wherein the images in the sequence of images represent a street view of the points of interest along a path of the multiple paths.

10. The computer system of claim 7, wherein the operations further comprise:
   ranking each of the images to form the sequence of images.

11. The computer system of claim 7, wherein the region is identified by receiving a name of the location.

12. The computer system of claim 7, wherein the region is identified by receiving a boundary of the region on an electronic map displayed on a computer screen.

* * * * *